July 28, 1959     K. A. RIEDEL     2,896,512
MACHINE TOOL COUNTERWEIGHT
Filed Dec. 8, 1954     3 Sheets-Sheet 1

INVENTOR
Kurt A. Riedel

July 28, 1959     K. A. RIEDEL     2,896,512
MACHINE TOOL COUNTERWEIGHT
Filed Dec. 8, 1954     3 Sheets-Sheet 2
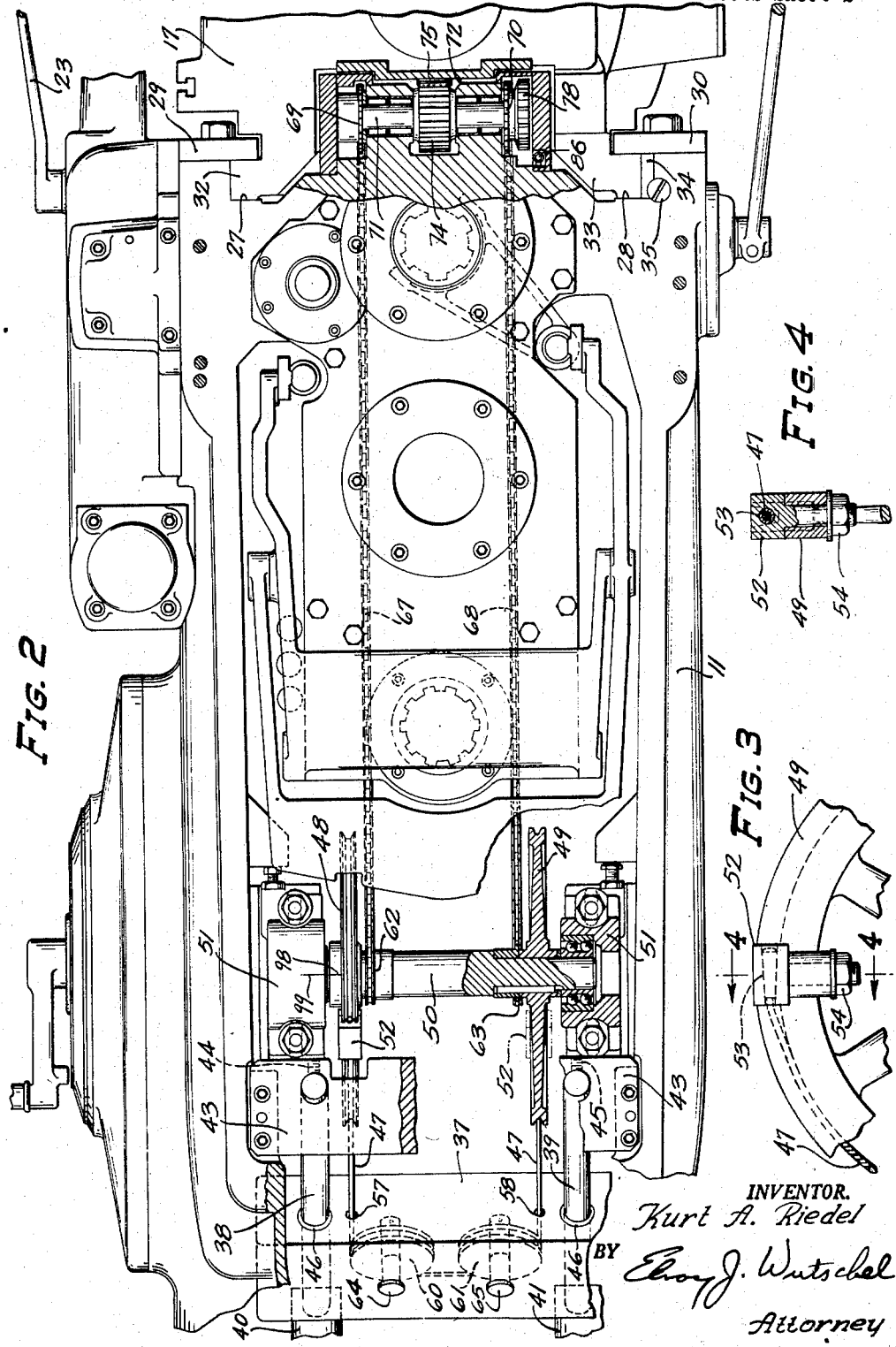
INVENTOR.
Kurt A. Riedel
BY Elroy J. Wutschel
Attorney July 28, 1959     K. A. RIEDEL     2,896,512
MACHINE TOOL COUNTERWEIGHT
Filed Dec. 8, 1954     3 Sheets-Sheet 3
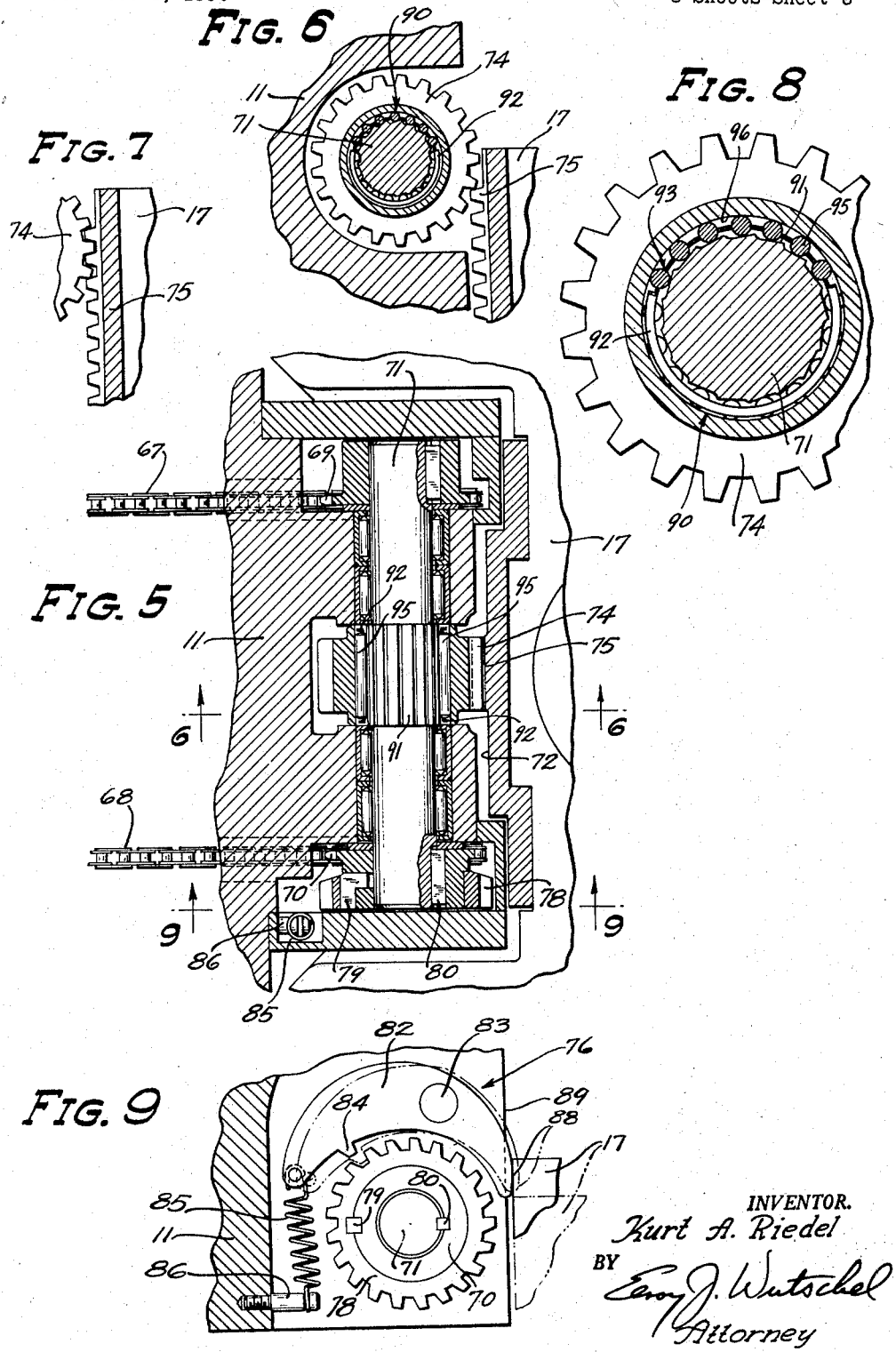

United States Patent Office 2,896,512
Patented July 28, 1959

2,896,512

MACHINE TOOL COUNTERWEIGHT

Kurt A. Riedel, Milwaukee, Wis., assignor to Kearney & Trecker Corporation, West Allis, Wis., a corporation of Wisconsin Application December 8, 1954, Serial No. 473,911

9 Claims. (Cl. 90—16)

This invention relates generally to machine tools and more particularly to an improved counterweight for a vertically movable member of a machine tool.

A principal object of this invention is to provide an improved counterbalancing mechanism for the vertically movable member of a machine tool.

Another principal object of the invention is to provide improved means for connecting a counterweight to effectively counterbalance the vertically movable member of a machine tool.

Another object of the invention is to provide in a milling machine of the vertically movable spindle type an improved counterweight for the vertically movable spindle carrying head.

Another object is to provide an improved driving mechanism for connecting a counterweight to the vertically movable spindle head of a machine tool.

Another object is to provide improved means for disengaging a counterweight from a vertically movable member of a machine tool.

A further object is to provide an improved mechanism for selectively adjusting the vertical height of a counterweight relative to a vertically movable machine member.

A still further object is to provide an improved latching mechanism for a vertically movable counterweight of a machine tool.

A still further object of the invention is to provide an improved mechanism for effecting a selective vertical adjustment of a counterweight relative to the member it is connected to counterbalance.

A still further object of the invention is to provide an improved selectively disengageable connection between a counterweight and the member it is connected to counterbalance.

According to this invention, a milling machine having a vertically movable spindle carrying head is provided with an improved mechanism for counterbalancing the spindle head to facilitate vertical adjustment thereof. To accomplish this, the spindle head is slidably carried toward the front upper portion of a machine column and is provided with a rack having meshing engagement with a pinon journalled in the front upper portion of the column. The pinion is urged to rotate in a direction to exert an upward force on the spindle head by means of a counterweight which is slidably carried within the column for vertical movement as the head is caused to be moved vertically. To simplify disassembly of the spindle head from the supporting column, there is provided a locking mechanism that is connected to restrain the counterweight against vertical movement whenever the spindle head is bodily removed from the column. For facilitating reassembly of the spindle head to the column, an overrunning clutch mechanism is connected to permit rotation of the driving pinion when the counterweight is locked against vertical movement.

The invention is exemplified herein by embodiments illustrated in connection with a representation of a typical machine tool structure. It is to be understood, however, that the particular embodiments shown are intended to be illustrative only and that various other structural forms, within the range of equivalents of the features defined in the subjoined claims, may be utilized in practicing this invention in connection with any of various other machine tools or similar apparatus.

The foregoing and other objects of this invention, which will become more apparent from the following detailed specification, may be achieved by the particular apparatus that is depicted in and described in connection with the following drawings in which:

Fig. 2 is a view in horizontal section through the upper portion of the column, taken generally along the lines 2—2 in Fig. 1, and showing the operative connection between the counterweight and the spindle head;

Fig. 3 is an enlarged fragmentary, detailed view in side elevation of a pulley wheel and showing the means of attaching one end of the cable to the periphery thereof;

Fig. 4 is an enlarged fragmentary detailed view in transverse section through the rim of the pulley wheel taken generally along the lines 4—4 in Fig. 3;

Fig. 5 is an enlarged fragmentary, detailed view in horizontal section through the upper forward portion of the column and the spindle head;

Fig. 6 is an enlarged fragmentary view in vertical section, taken generally along the lines 6—6 in Fig. 5 and showing the rack carried by the head about to be moved into operative engagement with the pinion;

Fig. 7 is an enlarged fragmentary view showing the rack and pinion moved into operative engagement;

Fig. 8 is an enlarged detailed fragmentary view in vertical section through the shaft and pinion hub, showing the overrunning clutch mechanisms connected therebetween; and, Fig. 9 is an enlarged fragmentary view in vertical section, taken generally along the lines 9—9 in Fig. 5, and showing the ratchet locking mechanism.

Figure 1:
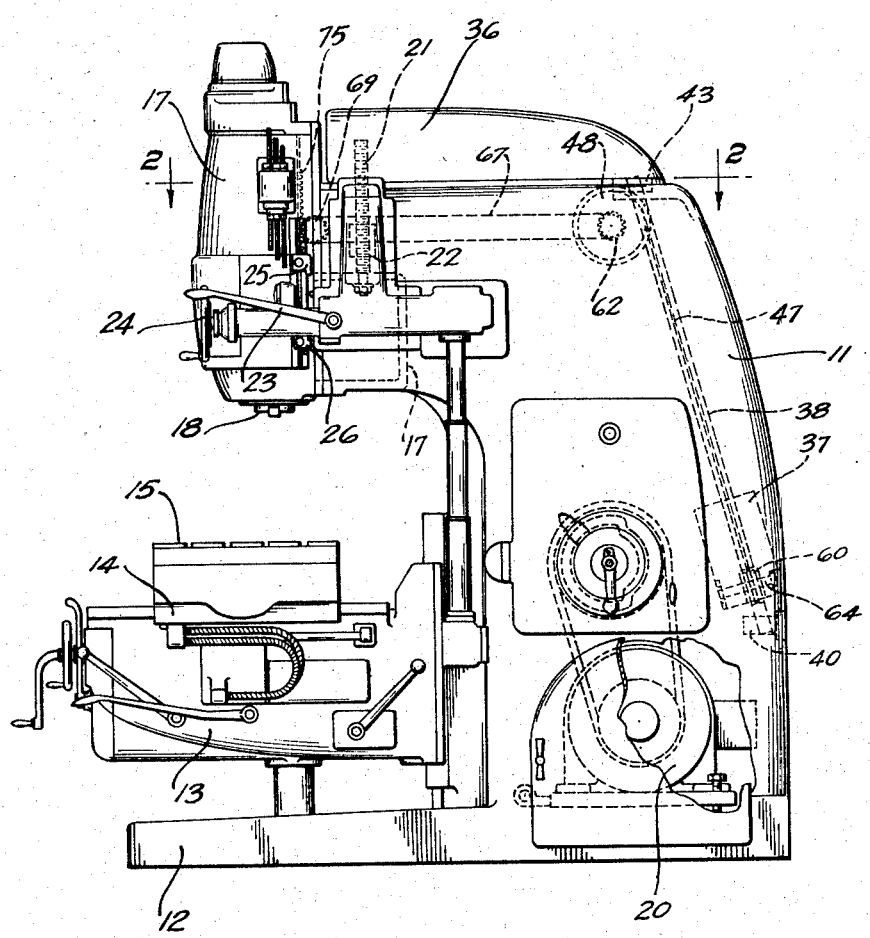
Figure 1 is a view in right side elevation of a vertical spindle, knee and column type milling machine exemplifying a machine tool in which the features of the present invention may be incorporated to advantage.

The machine tool shown generally in Fig. 1 as exemplifying a preferred embodiment of the invention, is a milling machine of the vertical spindle, knee and column type, although it is to be understood that various of the inventive features set forth herein may be incorporated in and utilized with advantage in machines of different construction.

Referring more specifically to the drawings and particularly to Fig. 1 thereof, the milling machine therein shown as an example of apparatus constituting a preferred embodiment of the invention comprises a vertically upstanding column 11 formed integrally with a forwardly extending base 12 and which is adapted to slidably support the usual work supporting members including a knee 13, a saddle 14, and a work table 15. The knee 13 is slidably secured to the front face of the column 11 for vertical adjustment above the base 12, and in turn, is adapted to carry in superimposed relationship the transversely movable saddle 14, and the longitudinally movable table 15.

At the upper front portion of the column 11, there is provided a spindle head 17 that is slidably mounted for vertical adjustment above the work table 15. A tool carrying spindle 18 journalled in the spindle head 17 is operatively connected by a transmission mechanism (not shown) to be rotatably driven by a main drive motor 20 carried within the hollow column 11. The main drive motor 20 is likewise connected in well known manner to effect selective movement of the work supporting members including the knee 13, the saddle 14, and the work table 15.

To effect selective vertical adjustment of the spindle head 17 along the upper portion of the column 11, an elevating screw 21 secured at its lower end to a rearwardly extending portion of the spindle head 17 is disposed to be threadedly engaged by a rotatable elevating screw nut 22 journalled in the upper forward portion of the column 11. Both power actuated and manual controlled means are connectable to rotate the elevating screw nut 22 for effecting the desired vertical movement of the spindle head 17 along the column 11. For effecting power controlled vertical movement of the spindle head, there is provided a pivotable clutch lever 23 that is operable to engage a power transmitting train from the motor 20 to rotate the elevating screw nut 22. For effecting manually controlled vertical adjustment of the spindle head 17, a handwheel 24 journalled in the upper front portion of the column 11 is connected to rotate the elevating screw nut 22 independently of the clutch lever 23. To limit the extent of vertical movement of the head 17 along the column 11, a pair of stop dogs 25 and 26 adjustably secured to the head 17 in well known manner are adapted to engage a forwardly extending portion of the column 11. The upper stop dog 25 is adjustably secured within a vertical track-way formed in the head 17 to limit downward movement of the head, while the lower stop dog 26 operates to limit upward movement of the head. After the spindle head 17 is positioned as required, a pivotable clamp lever is operative to actuate a clamp mechanism (not shown) for clamping the head to the column 11.

To guide the spindle head 17 during vertical adjustment, as shown in Fig. 2, the upper forward portion of the column 11 is provided with a pair of spaced apart vertical guideways 27 and 28. A pair of square gibs 29 and 30 bolted to the front upper portion of the column 11 are adapted to retain a pair of spaced apart, flanged guides 32 and 33 integrally formed with the spindle head 17 in slidable engagement with the guideways 27 and 28 respectively presented by the column 11. Another gib 34 of the angular taper type is retained in slidably adjusted position by means of an adjusting screw 35 to retain the flanged way guides of the spindle head 17 in laterally adjusted position relative to the guideways of the column. A top cover 36 is removably bolted to the upper portion of the column to enclose the operating mechanism contained therein.

To facilitate vertical adjustment of the spindle head 17 along the way surfaces of the column 11, a counterweight 37 movably carried in the rearward portion of the hollow column 11, is operatively connected to counterbalance the weight of the spindle head 17. The counterweight 37 is provided with a pair of spaced apart bored openings and is slidably carried for vertical movement by a pair of spaced apart vertical guide rods 38 and 39. At their lower ends, the guide rods 38 and 39 are received within tubular sockets formed in brackets 40 and 41, respectively, affixed to the inner rearward wall of the column 11. The upper ends of the guide rods 38 and 39 are received in bored holes formed in a plate 43 secured within the upper rearward portion of the column 11 and are secured thereto by means of clamp screws 44 and 45. By means of this arrangement, the guide rods 38 and 39 can be slidably withdrawn from the upper portion of the hollow column 11 after removing the top cover 36 and the screws 44 and 45. To facilitate the freely slidable vertical movement of the counterweight 37, a plurality of tubular bearings 46 carried in spaced relationship within the bored openings formed in the counterweight 37 are adapted to constitute the direct medium of engagement with the guide rods 38 and 39.

The counterweight 37 is operatively suspended to counterbalance the spindle head 17 by means of a single continuous cable 47 that is secured by its opposite upper ends to the respective peripheries of a pair of spaced apart pulleys 48 and 49, that are keyed to a rotatable shaft 50. The shaft 50 is journalled to rotate in a pair of brackets 51 and 51 secured within the upper rearward portion of the column 11. The opposite ends of the cable 47 are fixedly secured to the pulleys by means of clamp brackets 52 and 52 that are respectively bolted to the pulleys 48 and 49. Each of the brackets is secured to its associated pulley in a similar manner as illustrated by the enlarged detailed view, Fig. 3. As there shown, the pulley 49 is provided with a radially extending tubular opening adapted to receive the shank of the clamp bracket 52 as well as a square recess in the rim to receive the squared upper end thereof. The clamp bracket 52 is provided with a tapered bored opening 53 adapted to receive one end of the cable 47 which is secured therein by means of a ferrule or molten lead. The clamp bracket 52 is secured to the pulley 49 by means of a clamp nut 54. With the opposite ends of the cable 47 secured to the clamp brackets 52 and 52, and the brackets in turn secured to the pulleys 48 and 49, the portions of the cable immediately adjacent the clamp brackets are tangent to the peripheral grooves respectively presented by the pulleys 48 and 49. Thus, as the pulleys are rotated in a forwardly direction, the opposite end portions of the cable 47 are respectively taken up by the peripheral grooves presented by the pulleys.

The central stretch of the single continuous cable 47 is threaded through suitable vertical openings 57 and 58 provided in the counterweight 37 and thence about the peripheral grooves presented by a pair of pulley wheels 60 and 61 rotatably journalled in the lower central portion of the counterweight. The pulley wheels 60 and 61 are rotatably carried upon shafts 64 and 65 secured within the counterweight. The arrangement is such that, irrespective of any stretching of the continuous cable 47, the counterweight 37 will exert a balanced downward force upon the respective pulleys 48 and 49 and likewise on the rotatable shaft 50, to urge the pulleys and shaft to rotate in a rearward or counterclockwise direction. Slight rotational movement of the pulley wheels 60 and 61 journalled within the counterweight 37 operates to continuously equalize the downward force exerted by the opposite upper ends of the single continuous cable 47. As the counterweight 37 is moved upwardly, due to a downward movement of the spindle head 17, the upper ends of the continuous cable 47 are wound about and received by the peripheral grooves presented by the pulleys 48 and 49.

The rotatable shaft 50 that carries the pulleys 48 and 49 is provided with a pair of sprocket wheels 62 and 63 that are keyed to the shaft for rotation therewith. A pair of endless sprocket chains 67 and 68 trained about the sprocket wheels 62 and 63 are respectively disposed to engage a pair of sprocket wheels 69 and 70 keyed to a forwardly spaced rotatable shaft 71. The shaft 71 is journalled to rotate in a portion of the column 11 extending forwardly of the vertically extending guideways 27 and 28 presented thereby and in close proximity to the central portion of the rearward face 72 of the vertically movable spindle head 17. By means of this arrangement, the force exerted by downward movement of the counterweight 37 operates to actuate the sprocket chains 67 and 68 for urging the forward shaft 71 to rotate in a counterclockwise direction. Rotation of the shaft 71 effects a corresponding counterclockwise rotation of a pinion 74 associated therewith. The pinion 74, in turn, meshingly engages a rack 75 secured to the rearward central face 72 of the spindle head 17 to urge the spindle head upwardly. Thus, the effect of the counterweight 37 is to counterbalance the weight of the spindle head 17, thereby reducing to a minimum the power required to effect vertical adjustment of the spindle head along the upper forward portion of the column 11. Obviously, therefore, the counterweight operates to greatly facilitate the manual vertical adjustment of the spindle head 17 in response to operating the handwheel 24. The counterweight 37 likewise operates to so balance the weight of the spindle head 17 that the latter is more easily retained in a selected position of vertical adjustment.

It will be apparent that manipulation of the handwheel 24 to effect upward movement of the spindle head 17 will produce a downward movement of the counterweight 37 along the guide rods 38 and 39. Conversely, rotation of the handwheel 24 to move the spindle head 17 downwardly will produce an upward movement of the counterweight 37. To permit the use of a relatively small counterweight, compared to the weight of the spindle head 17, the pulleys 48 and 49 are approximately four times larger in diameter than the sprocket wheels 62 and 63, which in turn, are equal in diameter to the forward sprocket wheels 69 and 70. The counterweight 37 weighs approximately one-fourth as much as the spindle head 17 and is arranged to travel through a complete range of movement approximately four times as great as the range of movement of the spindle head 17. Due to the mechanical advantage made possible by the four to one driving ratio between the large diameter pulleys and the sprocket wheels, the relatively small counterweight is completely adequate to fully counterbalance the spindle head.

Whenever the spindle head 17 is bodily removed from the supporting column 11, a releasable ratchet mechanism 76, Fig. 9, operates to lock the shaft 71 against rotation and thereby precludes downward vertical movement of the counterweight 37. The ratchet mechanism 76 is operative to simplify the initial assembly of the spindle head 17 to the column 11 as well as to facilitate the disassembly of the spindle head from the column for adjustment or repair. As shown in Figs. 5 and 9, the rachet mechanism 76 comprises a ratchet wheel 78 that is secured to the hub of the sprocket wheel 70 by means of a key 79. Since the sprocket wheel 70 is secured in turn to the shaft 71 by means of a key 80, both the sprocket wheel 70 and the rachet wheel 78 are rotatable therewith. A movable pawl 82 pivotally mounted within the forward upper portion of the column 11 on a pin 83, is provided with a single ratchet tooth 84 that is complementary to the teeth presented by the ratchet wheel 78. A spring 85 secured at one end to the column 11 by means of a screw 86 is fastened with its opposite end to the pawl 82 in a manner to urge the ratchet tooth 84 carried thereby into meshing engagement with the ratchet wheel 78.

As indicated by the dotted lines in Fig. 9, the ratchet tooth 84 presented by the pawl 82 is shown in latching engagement with the ratchet wheel 78 to prevent rotation of the shaft 71 and to prevent downward vertical movement of the counterweight 37. With this condition existing, the pawl 82 is so pivoted by action of the spring 85 that the forward end 88 thereof is moved outwardly beyond the plane of a front surface 89 presented by the column 11. The pawl 82 is thus adapted to be retained in locking engagement with the ratchet wheel 78 whenever the spindle head 17 is moved out of engagement with the outer end 88 of the pivotal pawl 82 as indicated by the dotted lines in Fig. 9. At the same time, the rack 75 secured to the spindle head 17 is moved out of engagement with the pinion 74 which is then locked against clockwise rotation by clamping engagement of the pawl 82, Fig. 9, with the ratchet wheel 78. To reassemble the spindle head 17 into operative relationship along the column 11, it is necessary to slide the spindle head vertically upward relative to the column with the flanged ways 32 and 33 of the spindle head engaged by the square gibs 29 and 30 secured to the column. Upward vertical movement of the spindle head 17 is continued until all of the various interconnecting parts, including the cooperating screw 21 and nut 22, Fig. 1, as well as the rack 75 and pinion 74, Fig. 5, are in proper operatively interconnected relationship. In a similar manner, after removing the upper stop dog 25, Fig. 1, the spindle head 17 may be moved downwardly to disassemble it from the column 11.

As the spindle head 17 is moved downwardly, to disassemble it from the column, the rack 75, Figs. 2 and 5, is moved out of engagement with the pinion 74 at approximately the same time the upper portion of the head 17 is moved out of engagement with the outer end 88 of the ratchet pawl 82. As this occurs, as shown by the dotted lines in Fig. 9, the spring 85 operates to pivot the pawl 82 into locking engagement with the ratchet wheel 78 to lock the shaft 71 against rotation and prevent further downward movement of the counterweight 37. As soon as the shaft 71 is locked against rotation by the ratchet mechanism 76, it is necessary that the rack 75 be fully disengaged from the pinion 74 associated with the shaft 71 in order that downward movement of the spindle head 17 may be continued.

It will be apparent that the ratchet mechanism 76 provides a greatly simplified locking device for restraining the counterweight 37 against downward vertical movement whenever the spindle head 17 is disconnected therefrom; connecting the ratchet mechanism 76 to be actuated whenever the spindle head 17 is removed from the machine column operates automatically to immediately lock the counterweight 37 against downward movement. To disconnect the counterweight 37 from the spindle head 17, it is necessary only to bodily remove the spindle head from the column 11. Disconnecting the counterweight 37 from the spindle head 17 does not, therefore, require removal of the cover at the upper portion of the column or the manipulation of any of the movable members within the column that are associated with the counterweight. Thus, the counterweight 37 is disconnected from the spindle head 17 as an incident to the removal of the spindle head from the column 11. Furthermore, the ratchet mechanism 76 is operative, when latched, to retain the counterweight 37 in a proper position to facilitate reassembly of the spindle head 17 to the column 11.

Assume now that the spindle head 17 is moved vertically upward along the column 11 from the dotted line position indicated in Fig. 9 as would be necessary in reassembling it to the column. As the spindle head 17 is moved upwardly from the dotted line position to the full line position, Fig. 9, a certain interval of time must elapse before the outer end 88 of the pawl 82 is fully depressed to completely withdraw the ratchet tooth 84 from engagement with the ratchet wheel 78. During this brief interval, the upward movement of the rack 75 from its disengaged position, Fig. 6 to its engaged position, Fig. 7, tends to rotate the pinion 74 in a counterclockwise direction, although the shaft 71 is still locked against rotation by the pawl 82, Fig. 9. In order that the pinion 74 may be rotated in a counterclockwise direction during the brief interval in which the shaft 71 is locked against rotation, a roll over or overrunning clutch mechanism 90 is operatively interconnected therebetween.

The overrunning clutch mechanism 90, as shown in Fig. 8, is constituted in part by a plurality of peripherally adjacent, angularly disposed driving faces 91 integrally formed on the central portion of the shaft 71. A roller cage 92 provided with a plurality of circumferentially spaced slotted openings 93 is adapted to operatively retain a plurality of rollers 95 in circumferentially spaced operatively movable relationship to the angular driving faces presented by the central portion of the rotatable shaft 71. The number of rollers 95 carried by the cage 92 correspond to the number of faces 91 presented by the shaft 71, there being one roller for each successive angular face of the shaft. The pinion 74 is provided with an enlarged internal bore 96 in a manner to loosely constrain the rollers 95 within the cage 92 whenever the pinion 74 is caused to be rotated in a counterclockwise direction at a faster rate than the shaft 71. This same condition of operation will also occur if the shaft 71 is rotated in a clockwise direction at a faster rate than the pinion 74. In either event, the rollers 95 will be pushed out of engagement with the internal bore of the pinion 74 which will then be in overrunning relationship to the shaft 71. This arrangement, therefore, permits the rack 75 to rotate the pinion 74 in a counterclockwise direction in that interval of time immediately prior to the pawl 82 being withdrawn from latching engagement with the ratchet wheel 78 by upward movement of the spindle head 17.

As soon as the pawl 82 is fully withdrawn from engagement with the ratchet wheel 78, the counterweight 37 urges shaft 71 to rotate in a counterclockwise direction relative to the pinion 74 causing the rollers 95 to roll outwardly up the inclined driving faces 91 presented by the shaft 71. The rollers 95 will then be retained in wedging driving engagement between the angular driving faces 91 presented by the shaft 71 and the internal bore 96 of the pinion 74, thereby causing the pinion 74 to rotate in unison with the shaft 71. This condition prevails during normal machine operation with the rollers 95 constituting the medium of driving engagement between the pinion 74 and the shaft 71. Since the counterweight 37 is suspended from the pulleys 48 and 49, Fig. 2, the rearward shaft 50 secured thereto is urged to rotate in a counterclockwise direction. In like manner, the sprocket chains 67 and 68 urge the forward shaft 71 to rotate in a counterclockwise direction to retain the rollers 95 in wedging engagement with the pinion 74 which engages the rack 75 to urge the spindle head 17 upwardly. As the spindle head 17 is moved upwardly or downwardly, the counterweight 37 is continuously connected to balance the weight of the head 17 and minimize the force required to effect vertical movement thereof.

In addition to facilitating both disassembly and reassembly of the spindle head 17 relative to the column 11, the roll over clutch mechanism 90, together with the ratchet mechanism 76, is operative to effect a selective relative adjustment between the spindle head 17 and the counterweight 37. This arrangement is likewise advantageous in establishing the proper relative positioning adjustment between the counterweight and the spindle head when the machine is initially assembled.

Whenever the spindle head 17 is removed from the column 11, it will be apparent that the counterweight 37 is retained by the ratchet mechanism 76 toward the highest point of its range of allowable movement within the hollow column 11. Replacing the spindle head 17 in an operative position upon the column 11 causes the pinion 74 to be rotated slightly in a counterclockwise direction relative to the shaft 71 in the brief interval the shaft is locked against rotation. This slight repositioning movement of the pinion 74 relative to the shaft 71 in turn effects a slight difference in the vertical positioning of the counterweight 37 relative to the spindle head 17. As a result, the counterweight 37 will then be moved through a range of movement that is slightly higher, with respect to the column 11, than the range of movement prior to the spindle head being removed from and replaced on the column 11. Each succeeding time the spindle head is removed from the column, after being replaced thereon as described, the counterweight 37 is latched at a slightly higher point within the column. Eventually, assuming it is necessary to remove and replace the spindle head 17 a considerable number of times, the counterweight 37 would be gradually moved to its top limit of allowable movement within the column. It would then be necessary to relocate the counterweight 37, relative to the spindle head 17 and the column 11.

To properly relocate the counterweight 37 relative to the column, the top cover 36 is removed therefrom to provide access to the counterweight sprocket mechanism shown in Fig. 2. With the top cover 36 removed, the pulleys 48 and 49 are urged by manual means to rotate slightly in a forward direction to relieve the force exerted by the counterweight against the shaft 71 and ratchet mechanism 76. Then, with the pulleys 48 and 49 restrained against rotation, the outer end of the ratchet pawl 82, Fig. 9, is manually depressed to withdraw the ratchet tooth 84 from engagement with the ratchet wheel 78. With the pawl 82 retained in manually disengaged position, the pulleys 48 and 49, Fig. 2, are rotated in a rearward direction to lower the counterweight slightly within the column. The proper required distance to lower the counterweight 37 is determined by matching a pair of zero marks 98 and 99 respectively scribed on the hub of the pulley 48 and the support bracket 51. With the zero marks 98 and 99 aligned, the pawl 82, Fig. 9, is released and resiliently urged to engaged position to again latch the counterweight against downward movement. The spindle head 17 is then operatively reassembled to the column with the rack 75 operatively engaging the pinion 74 as hereinbefore explained and the top cover 36 replaced on the column 11.

A similar procedure to the one utilized for relocating the counterweight 37 relative to the spindle head 17 can likewise be employed to properly position the counterweight relative to the spindle head during initial assembly of the machine. After the counterweight has been properly positioned in the column 11 relative to its range of movement as effected by the spindle head 17, the zero mark 98 is scribed on the hub of the pulley 48 to provide a reference mark for repositioning the counterweight in the event it is necessary.

From the foregoing description of the illustrative structure set forth herein to disclose the principles of the invention, it is apparent that there has been provided an improved counterbalancing mechanism for the movable member of a machine tool. While the invention is shown adapted to counterbalance the spindle head of a milling machine, it may be adapted to counterbalance the vertically movable members of other machine tools with equal utility.

Although the invention has been described in considerable detail in order to fully disclose the invention and its application, it is to be understood that the particular apparatus shown and described is intended to be illustrative only and that the various novel features of the invention may be incorporated in other structural forms without departing from the spirit and scope of the invention, as defined in the subjoined claims.

The principles of this invention having now been fully explained in connection with the foregoing description, I hereby claim as my invention:

1. In a machine tool, a frame, a spindle head slidably carried by said frame for vertical movement and being bodily removable therefrom, a counterweight movably carried by said frame and being operatively connected to counterbalance said spindle head, disconnectable gearing operatively interconnected between said counterweight and said spindle head, said gearing being disconnected whenever said spindle head is bodily removed from said frame, and a movable latching mechanism actuatable to lock said counterweight against downward movement whenever said gearing is disconnected by bodily removal of said spindle head from said frame and from engagement with said latching mechanism, said latching mechanism being connected to be retained in unlatched position by direct physical engagement with said spindle head whenever said spindle head is operatively carried by said frame for vertical movement and said gearing is operatively interconnected between said counterweight and said spindle head.

2. In a machine tool, a frame, a spindle head slidably carried by said frame for vertical movement and being bodily removable therefrom, a mechanism connected to counterbalance said spindle head to facilitate vertical movement thereof and comprising a rack secured to said spindle head, a pinion journalled in said frame connected to engage said rack, a shaft connected to rotate said pinion in a direction to urge said rack and said spindle head upwardly, an overrunning clutch operatively interconnected between said pinion and said shaft, a sprocket wheel secured to said shaft, a second shaft journalled in said frame in spaced relationship relative to said first shaft, a sprocket wheel secured to said second shaft, a sprocket chain operatively interconnecting said sprocket wheels, a pulley wheel secured to said second shaft, a cable secured at one end to the periphery of said pulley wheel, a counterweight suspended from said cable in a manner to urge said pulley wheel to rotate in a direction to rotate said first shaft and said pinion for urging said spindle head to move upwardly, and a latching mechanism connected to lock one of said shafts against rotation automatically by bodily removal of said spindle head from said frame, said latching mechanism connected to be automatically actuated to unlatched position upon repositioning movement of said spindle head on said frame.

3. In combination with a machine tool having a hollow frame, a counterbalancing mechanism carried within said frame comprising a rotatable shaft, a counterweight connected to urge said shaft to rotate, a ratchet wheel secured to said shaft, a pivotable pawl engageable with said ratchet wheel to lock said shaft against rotation for preventing downward movement of said counterweight, a spindle head movably mounted on said frame and connected to be counterbalanced by said counterweight, and disconnectable gearing operatively interconnected between said spindle head and said shaft, said spindle head being bodily removable from said frame to disconnect said gearing and simultaneously therewith to actuate said pawl for automatically latching said ratchet and said shaft against rotation.

4. In a machine tool, a hollow frame, a spindle head slidably carried by said frame, said spindle head adapted to be bodily removable from said frame, a rack secured to said spindle head, a pinion journalled in said frame adapted to be engaged by said rack whenever said head is operatively carried by said frame for slidable vertical movement, a shaft connectable to said pinion, a counterweight movably suspended within said frame connected to said shaft to urge said pinion to rotate in a direction causing said rack and said spindle head to move in an upward direction, and a latching mechanism for said shaft including a movable actuating pawl connected to be engaged by said head whenever said head is operatively carried by said frame for retaining said mechanism in unlatched position, said pawl being operative to lock said shaft against rotation whenever said spindle head is bodily removed from said frame and said rack is disengaged from said pinion.

5. In a machine tool, a frame, a vertically movable member slidably carried by said frame and being bodily removable therefrom, a counterbalancing mechanism for said vertically movable member comprising a pinion journalled in said frame, a first shaft connectable to rotate said pinion, a sprocket wheel secured to said first shaft, a second shaft journalled in said frame, a sprocket wheel secured to said second shaft, a sprocket chain operatively interconnected between said sprocket wheels for transmitting movement therebetween, a large diameter pulley wheel secured to said second shaft, a cable secured at one end to the periphery of said pulley wheel for rotation thereabout, a counterweight suspended by said cable in a position to urge said pulley wheel to rotate, a rack secured to said member adapted to meshingly engage said pinion whenever said member is operatively carried by said frame for vertical movement, and a latching mechanism for said first shaft including a movable actuating pawl positioned to be engaged by said member whenever said member is slidably carried by said frame for vertical movement, said pawl being movable for locking said shaft against rotation whenever said member is bodily removed from said frame and said rack is disengaged from said pinion.

6. In a machine tool, a member movably carried for vertical movement, a frame adapted to guidably support said member for vertical movement, a rack presenting rack teeth secured to said member, a pinion journalled in said frame connected to engage said rack, a shaft journalled in said frame connected to rotate said pinion, an overrunning clutch operatively interconected between said pinion and said shaft, and a vertically movable counterweight connected to rotate said shaft in a direction to actuate said clutch in a manner to effect rotation of said pinion, said pinion being operative when actuated by said clutch to urge said rack and said member to move in an upward direction and said pinion being operable to overrun said shaft in such a manner as to permit a relative adjustment between said member and said counterweight.

7. In a machine tool, a frame, a spindle head slidably carried by said frame for selective vertical movement, a rack presenting rack teeth carried by said spindle head, a pinion journalled to rotate in said column in meshing engagement with said rack, said pinion being urged to rotate in a direction to urge said rack and said spindle head upwardly, an independently rotatable shaft journalled in said column adapted to rotatably support said pinion, overrunning clutch means operatively interconnected between said pinion and said shaft, a counterweight in said column operatively connected to urge said shaft to rotate in a direction to actuate said overrunning clutch to transmit power for rotating said pinion in a corresponding direction, said pinion being operative when so driven by said clutch as to urge said rack and said spindle head upwardly, and a latching mechanism connectable to latch said shaft against rotation to prevent movement of said counterweight whenever said spindle head is removed from said machine, said latching mechanism being actuated to unlatched position by operative physical engagement with said spindle head whenever said spindle head is operatively positioned on said frame for vertical movement.

8. In a machine tool, a frame, a member slidably carried by said frame for vertical adjustment, a rack secured to said member, a pinion journalled in said frame disposed to meshingly engage said rack, a counterweight suspended within said frame being connected to urge said pinion to rotate in a direction to urge said rack and said member to move upwardly, a roll over clutch mechanism operatively interconnected between said pinion and said counterweight, said roll over clutch mechanism being operative to retain said counterweight in engagement to urge said member upwardly, said roll over clutch mechanism being operative to permit independent upward movement of said member when said counterweight is restrained against downward movement whereby the relative vertical position of said member is selectively adjustable relative to the vertical position of said counterweight without disconnecting the operative connection therebetween.

9. In a machine tool, a frame, a spindle head slidably carried by said frame for selective vertical adjustment, said spindle head being bodily removable from said frame, a rack presenting rack teeth carried by said spindle head, a cooperating pinion journalled in said frame disposed to meshingly engage said rack whenever said spindle head is operatively mounted on said frame for slidable movement, a counterweight connected to said pinion causing rotation in a direction for urging said rack and said spindle head uuwardly whenever said spindle head is operatively mounted on said frame for slidable movement, and a latching device operatively associated with said pinion and said counterweight, said latching device being retained in unlatched position whenever said spindle head is operatively carried by said frame for vertical slidable movement, said latching device being actuated to latched position preventing rotational movement of said pinion is response to said counterweight whenever said spindle head is bodily removed from said frame.

References Cited in the file of this patent

UNITED STATES PATENTS

| | | |
|---|---|---|
| 1,126,212 | Hendee | Jan. 26, 1915 |
| 1,314,635 | Conradson | Sept. 2, 1919 |
| 1,577,975 | Klausmeyer | May 23, 1926 |
| 1,932,305 | Escole | Oct. 24, 1933 |
| 1,958,507 | Archea | May 15, 1934 |
| 2,130,487 | Foley | Sept. 20, 1938 |
| 2,484,885 | Hassman et al. | Oct. 18, 1949 |
| 2,696,763 | Daugherty et al. | Dec. 14, 1954 |